INVENTORS
DONALD D. GRIEG
HERBERT F. ENGELMANN
JOHN A. KOSTRIZA
BY Percy P. Lantzy
ATTORNEY INVENTORS
DONALD D. GRIEG
HERBERT F. ENGELMANN
JOHN A. KOSTRIZA
BY
Percy P. Lantzy
ATTORNEY

INVENTORS
DONALD D. GRIEG
HERBERT F. ENGELMANN
JOHN A. KOSTRIZA
BY
ATTORNEY

MICROWAVE RADIO RECEIVER

Original Filed Oct. 28, 1952 4 Sheets-Sheet 4

INVENTORS
DONALD D. GRIEG
HERBERT F. ENGELMANN
JOHN A. KOSTRIZA
BY
ATTORNEY

United States Patent Office 2,951,149

Patented Aug. 30, 1960

2,951,149

MICROWAVE RADIO RECEIVER

Donald D. Grieg, North Caldwell, and Herbert F. Engelmann, Mountain Lakes, N.J., and John A. Kostriza, Lexington, Mass., assignors to International Telephone and Telegraph Corporation, Nutley, N.J., a corporation of Maryland Continuation of abandoned application Ser. No. 317,206, Oct. 28, 1952. This application Jan. 4, 1960, Ser. No. 2,321

11 Claims. (Cl. 250—20)

This invention relates to high frequency radio systems and more particularly to microwave radio receiving apparatus utilizing printed circuitry in both the high and low frequency sections thereof. This is a continuation of our patent application, Serial No. 317,206, filed October 28, 1952, now abandoned.

Microwave receiving apparatus heretofore proposed have required, particularly for the high frequency section thereof, expensive and bulky components including waveguides, special frequency mixing devices, and other structural elements commonly referred to as "microwave plumbing." As technical development has progressed in the use of microwave radio apparatus, such as in short wave receivers, radar, direction finding devices, and radio aerial navigation devices, the demand has grown for larger quantities of such apparatus and particularly for less expensive, smaller, and lighter weight microwave equipment.

One of the objects of this invention is to provide microwave radio apparatus which is not only less expensive but is also relatively simple, compact, and considerably lighter in weight than corresponding apparatus employing the usual "microwave plumbing."

Another object is to provide an improved radio frequency section for translating high frequency or microwave signals to low frequency signals.

Still another object of the invention is to provide microwave radio receiver apparatus utilizing a new principle of chassis and component assembly; and a further object is to so provide such a chassis construction as to utilize to advantage printed circuit techniques, both for the high and low frequency sections thereof.

One of the features of the invention is the utilization of a basic principle applicable in a theoretically perfect parallel conductor transmission system. If a parallel conductor transmission line could be made so that the electric and magnetic fields thereof were maintained substantially the same therealong regardless of small irregularities of shape and size and relative spacing of the conductors, such as may be obtained by having identical conductors with a given constant spacing therebetween, a minimum of radiation loss would be experienced. Such theoretically perfect parallel conductor systems are, however, for all practical purposes unobtainable. In the copending application of D. D. Grieg, H. F. Engelmann, Serial No. 234,503, filed June 30, 1951, now Patent No. 2,721,312, a transmission system is disclosed which utilizes this theoretically perfect parallel line principle without requiring the exact identity and spacing of the two parallel conductors. The present invention makes use of this transmission principle by utilizing a chassis wall or conductive panel as a first or "ground" conductor which supports the second or "line" conductor in a desired configuration or circuit on a thin layer of dielectric material, thus spacing the line conductor in close, substantially parallel relation to the planar surface of the ground conductor. By making the ground conductor considerably wider than the line conductor, an image effect is obtained which provides in effect an electric and magnetic field distribution between the two conductors, which is believed to be substantially the same as the distribution between one conductor and the neutral plane of a two-conductor parallel system. The so-called ground conductor theoretically might have a width extending to infinity but for practical purposes need only be slightly wider than the line conductor so long as its greater width provides for ample concentration of the electric field between adjacent surfaces of the two conductors. The width of the ground conductor, however, may be considerably wider than the line conductor, and in fact might comprise an extended conductor surface capable of cooperating as a common planar conductor surface to several circuits formed by line conductors spaced in close, substantially parallel relation thereto. The diameter or width of the line and the spacing between the line and the planar conductor determines the characteristic impedance of the line-above-ground transmission path. The spacing is preferably a fraction of a quarter wavelength of the operating frequency, the spacing usually being less than the width of the line conductor.

By using one or more of the walls or panels of a chassis as the ground conductor and by applying a layer or sheet of dielectric thereto, the circuitry of both the high and low frequency portions of a microwave receiver may be applied to such layer by known printed circuit techniques. The chassis wall or panel may also serve as "ground" and as a support for components, such as tubes, crystals, condensers, resistors, coils, and the like. By placing the circuitry on one side of the planar conductor and components on the other side, the planar conductor also functions as a shield. In the low frequency section the ground conductor portion of the panel may be omitted thereby permitting circuit printing on both sides of the dielectric sheet.

The above-mentioned and other features and objects of this invention will become more apparent by reference to the following description taken in conjunction with the accompanying drawings, in which.

Figure 1:
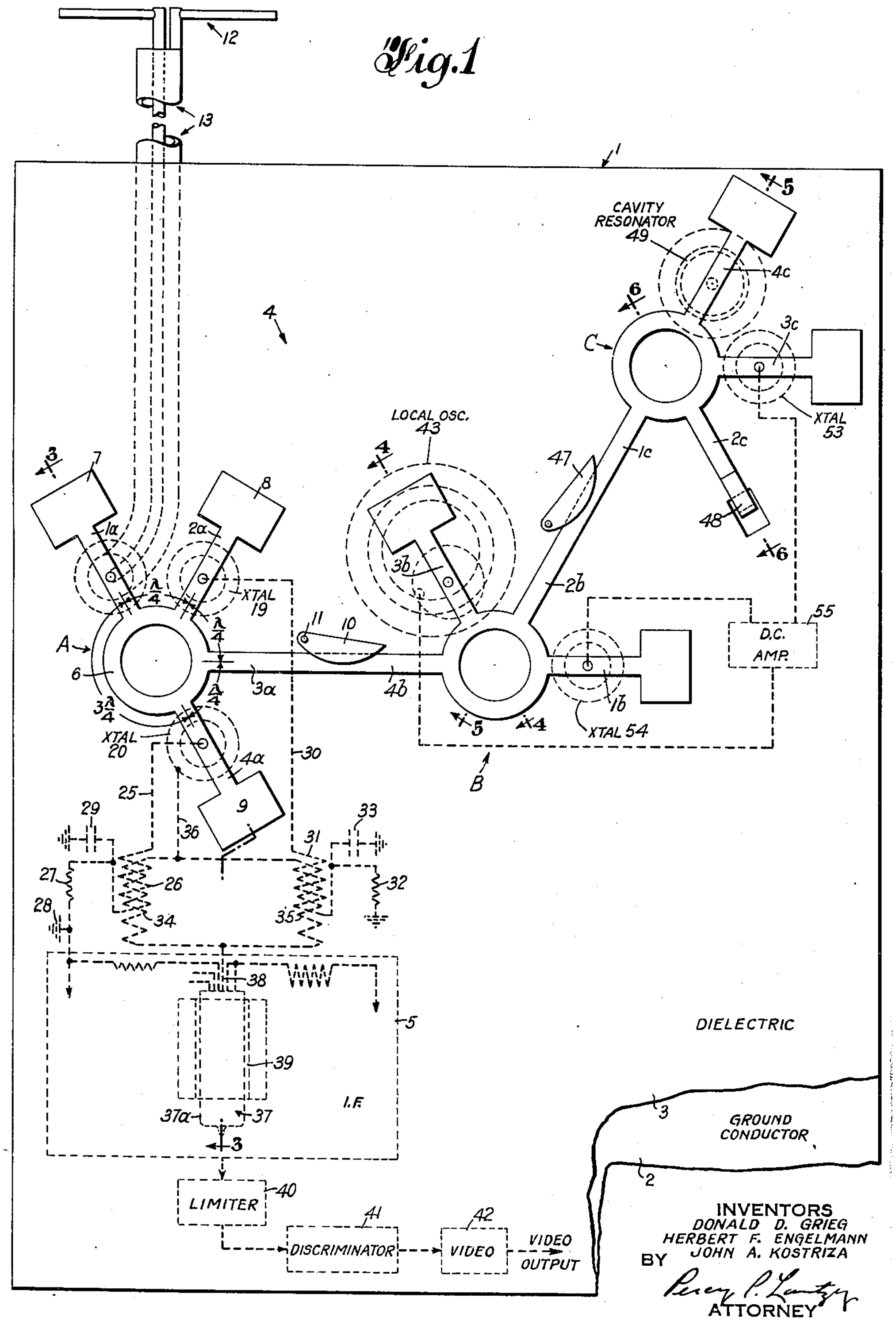
Fig. 1 is a plan view showing microwave receiving equipment, with certain parts illustrated in block diagram, to illustrate the principles of this invention.

Referring to Fig. 1 of the drawing, a panel of a microwave receiver is indicated at 1 as comprising a planar conductor 2 and a layer or sheet of dielectric material 3 disposed adjacent the planar surface thereof. The planar conductor 2 functions as a common ground conductor for the high or radio frequency section 4 and the intermediate frequency section 5 as well as for any additional low frequency circuitry, such as the audio frequency section, that may be supported on the panel 1. The high frequency section 4 of this embodiment is shown to comprise three hybrid coupler or mixer circuits A, B, and C, each comprising four branches as indicated at 1*a*, 2*a*, 3*a*, and 4*a* for the first hybrid circuit A. The branch conductors of hybrid circuits B and C are similarly identified, the branches for circuit B being indicated at 1*b*, 2*b*, 3*b*, and 4*b*, while the branch conductors of circuit C are indicated as 1*c*, 2*c*, 3*c*, and 4*c*.

Referring particularly to the hybrid circuit A, the branch conductors thereof are connected together by an annular conductor 6, the first and fourth branch conductors 1*a* and 4*a* being connected thereto at diametrically opposite points, substantially three-quarters of a wavelength apart, while the conductors 2*a* and 3*a* are connected to the annular conductor at points one-third and two-thirds, or one-quarter and one-half wavelength, respectively, of the distance between the connection points of branch 1*a* and branch 4*a*. These distances, of course, may be increased by an integral number of wavelengths or, if desired, any two arcs between branch conductors may be increased each by a half wavelength. These branch conductors being thus arranged and disposed in a plane substantially parallel to the plane of the conductor 2 provide for flow of high frequency signals in a manner similar to the well-known coaxial hybrid ring junction. By way of example, a signal wave applied to the branch 1*a* divides at the connection of the branch to the annular conductor for flow thereabout and in phase out branch 2*a* and branch 4*a* to the exclusion of branch 3*a* where the signal wave energy flowing in opposite directions along the annular conductor 6 are 180° out of phase. Flow of energy over branch 3*a* toward its connection with the annular conductor 6 is similarly divided between branches 2*a* and 4*a* to the exclusion of branch 1*a*. For further information regarding details of the hybrid structure and theory of operation, references may be had to the copending application of H. F. Engelmann and J. A. Kostriza, Serial No. 274,855, filed March 5, 1952, now Patent No. 2,749,521. It should be understood, of course, that other forms of hybrid circuits may be employed, making similar use of the line-above-ground principle, another example being shown in Fig. 7.

In order to avoid reflections from the ends of the branch conductors of the hybrid ring mixer, those branches that are terminated in open relation are provided with an extended area in parallel relation to the planar conductor 2, which in effect comprises susceptances for matching the adjacent input coupling or crystal junction to the characteristic impedance of the transmission line formed by the branch conductor and the adjacent planar surface of conductor 2. Such terminations are illustrated at 7, 8, and 9 for branches 1*a*, 2*a*, and 4*a*. If desired, other forms of matching terminations may be employed, such as a pad of resistive material disposed in close relationship to the branch conductor, similarly as illustrated by the pad 10 which is adjustable about pin 11 with respect to the branch line 3*a*, or by a short to ground connections suitably located beyond the junction to be matched.

Figure 2:
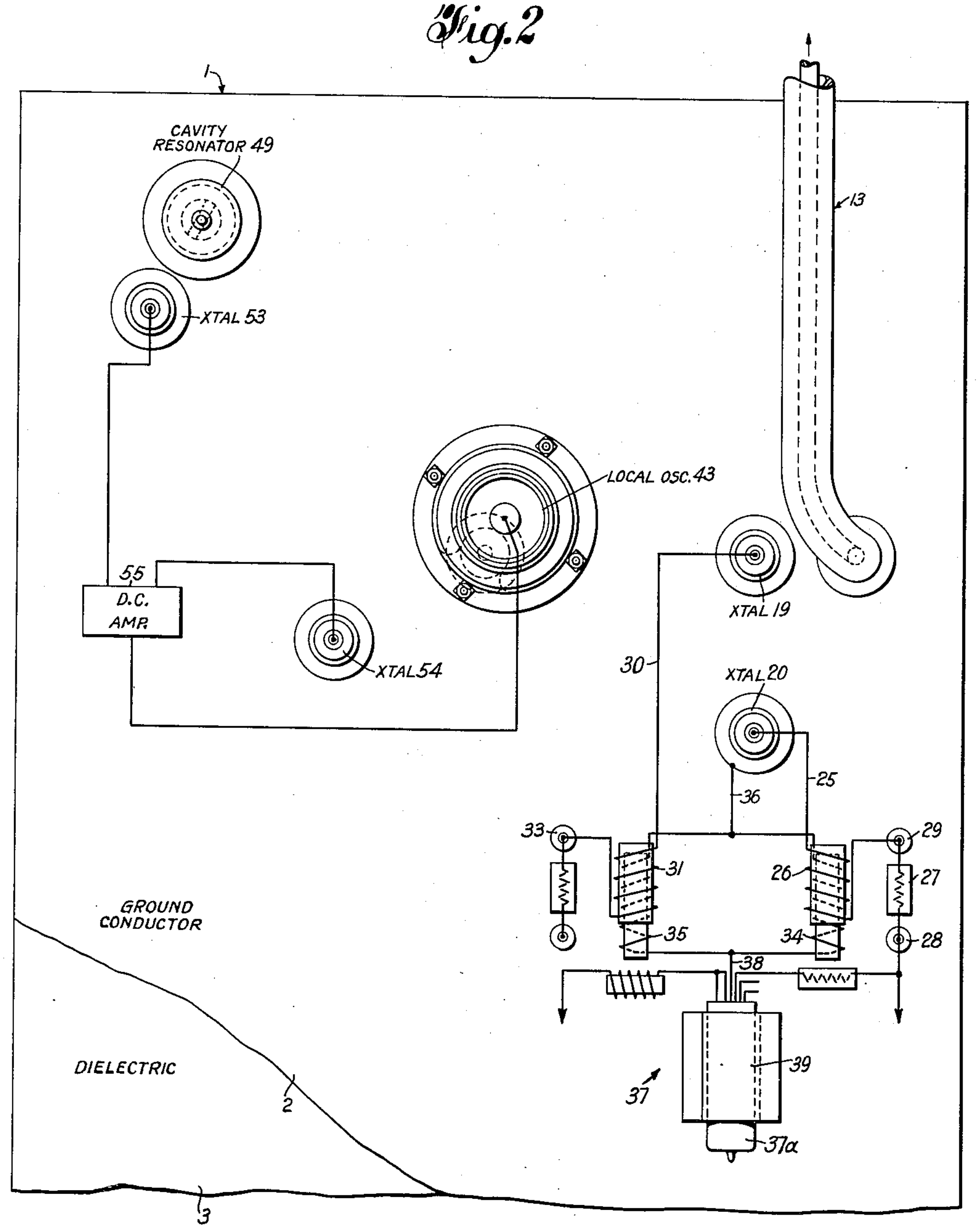
Fig. 2 is a bottom plan view of the receiver equipment illustrated in Fig. 1.
Figures 3, 4, 5, 6:
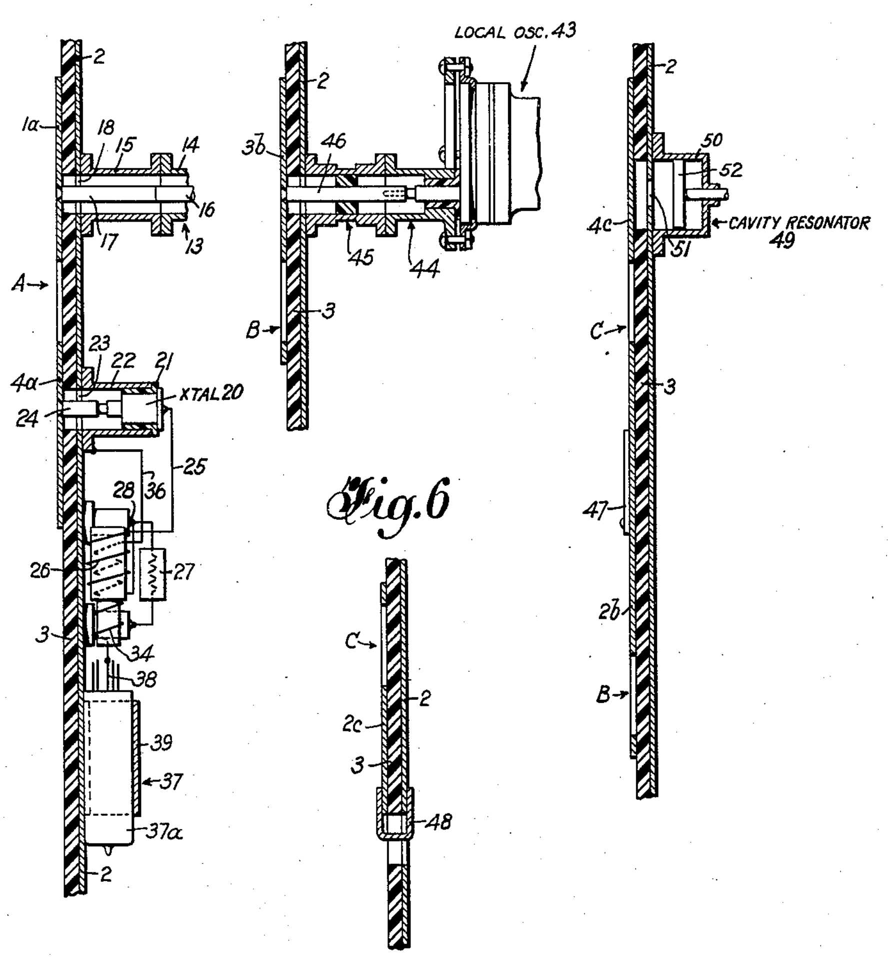
Fig. 3 is a sectional view taken along line 3—3 of Fig. 1 showing the mounting arrangement for the microwave input signals, a crystal detector mounting, and the coupling transformer to the I.-F. section.
Fig. 4 is a sectional view taken along line 4—4 of Fig. 1 showing the mounting arrangement of an oscillator of the klystron type.
Fig. 5 is a cross-sectional view taken along line 5—5 of Fig. 1 showing the mounting arrangement of the cavity resonator.
Fig. 6 is a sectional view taken along line 6—6 of Fig. 1 showing a shorted connection between a line conductor and the ground conductor.

Referring to the illustrations contained in Figs. 1, 2, and 3, the microwave signal applied to the mixer A is received by antenna 12 conducted therefrom over coaxial line 13 to the branch 1*a*. The outer conductor 14 is coupled by means of a terminal sleeve 15 to the underside of the panel conductor 2 as indicated in Fig. 3. The inner conductor 16 is similarly coupled to the branch conductor 1*a* by conductor 17 which extends through an opening 18 in the conductor 2. The microwave energy applied over the coaxial line 13 is launched for flow in the TEM mode along the branch line between the branch conductor and the associated planar surface of conductor 2. The energy thus received is divided between the branch lines 2*a* and 4*a* to which are coupled two crystal detectors 19 and 20. Fig. 3 shows the coupling arrangement for the crystal detector 20, the crystal being received in a dielectric sleeve 21 which in turn is received in a terminal sleeve 22 connected to the backside of the planar conductor 2. The conductor 2 is provided with an opening 23 through which a connector 24 couples the line conductor of branch 4*a* to the crystal 20. The output of the crystal is coupled over conductor 25 (see Figs. 1 and 3) to coupling coil 26, and from there through resistor 27 to a ground connection 28 made with the planar conductor 2. Any ground connection in the circuitry A, B, and C may be used as a D.-C. return path for the crystals, such ground connection may be at the termination of one of the branch conductors such as at 48, circuit C, Figs. 1 and 6. An R.-F. by-pass condenser 29 is also coupled from the coil 26 to the conductor 2. The output of the crystal detector 19 is similarly connected by conductor 30 to coil 31 which is connected by resistor 32 and condenser 33 to the ground conductor 2. For further details of crystal holders adapted to line-above-ground circuits, reference may be had to copending application of H. F. Engelmann and J. A. Kostriza, Serial No. 233,052, filed June 22, 1951, now Patent No. 2,734,170.

Coupled with the coils 26 and 31 (Figs. 1 and 2) are coils 34 and 35 which are connected in parallel, one side being connected to ground as indicated by conductor 36 and the other to a control grid of the first stage 37 of the I.-F. section 5, as indicated by conductor 38. The I.-F. section may comprise several stages in which the vacuum tubes are supported on the panel 1 substantially as indicated by mounting bracket 39 carried by the ground conductor 2. The tube 37*a* is shown to be in the form of the miniature or sub-miniature type receivable in brackets such as indicated at 39. Larger tubes, either in the I.-F., audio, or power sections may be supported on panel 1 by conventional sockets. The conductor 2 may be cut away where desired in the low or intermediate frequency section. The output of the I.-F. section 5 is applied to the usual limiter 40 which is connected to a discriminator 41 to which is connected a video amplifier stage 42, all of which may be carried by panel 1 or chassis walls associated therewith.

The local oscillator 43 which furnishes frequency energy to beat with the incoming microwave signals is mounted on the ground conductor 2, as indicated in Figs. 1, 2, and 4. While the oscillator here shown is a klystron, any other suitable high frequency oscillator may be employed. The output of the oscillator 43 is shown to comprise a coaxial connection 44 which is coupled to a coaxial connection 45, the outer conductor of which is connected directly to the ground conductor 2, while the inner conductor 46 thereof is extended through an opening in the ground conductor to the line conductor of branch 3*b*. Energy from the oscillator 43 flows over branch 3*b* of circuit B where the energy divides between branch 2*b* and 4*b*, the portion flowing over branch 4*b* being attenuated according to the adjustment of the attenuator 10 and applied to the mixer circuit A over branch 3*a* where it is divided between branches 2*a* and 4*a*. The energy from the oscillator thus beats with the signal energy which also divides between branches 2*a* and 4*a* for application to crystal detectors 19 and 20. The outputs of the crystal detectors are coupled to the I.-F. section 5 as hereinbefore described.

The oscillator 43 is provided with an AFC circuit which includes hybrid circuits B and C. The two circuits are coupled together by means of branch lines 2*b* and 1*c*, the coupling being provided with an attenuator 47. The branch line 2*c* is shorted to the ground conductor 2 as indicated at 48, Figs. 1 and 6. The branch line 4*c* is coupled to a cavity resonator 49 which comprises a housing 50, Fig. 5, communicating through an opening 51 contained in the ground conductor 2 with the space between conductors 2 and 4*c*, whereby microwave energy propagated along the branch 4*c* is coupled to the resonator 49. If desired, the resonator may be provided with an adjustable tuning plunger 52. The branch 3c is coupled to a crystal detector 53 in the same manner as shown for crystal 20, Fig. 3. The branch line 1b of circuit B is likewise coupled to a crystal detector 54 in the manner illustrated for crystal 20. A D.-C. amplifier 55 having a balanced input is coupled to the outputs of crystals 53 and 54, the output of the amplifier 55 being coupled to a suitable electrode of the oscillator 43 for frequency stabilization purposes.

In operation of the AFC circuit the energy from oscillator 43 is divided in hybrid circuit B between the legs 2b and 4b. The portion of the oscillator energy applied over branch line 2b is partially attenuated at 47 and applied to branch line 1c to mixer C, the energy dividing between branch lines 2c and 4c. Partial reflections from cavity resonator 49 and the short 48 arrive in phase at the connections of branch lines 1c and 3c, the branch 3c feeding the reflected energy to crystal detector 53 where the detected energy is applied to the amplifier 55. The reflected energy flowing out branch line 1c is fed past the attenuator pad 47 to branch line 2b of circuit B where it divides between branch 1b and 3b, the part flowing out branch 1b being applied to the crystal detector 54, the detected output of which is applied to the other input connection of discriminator 55. It will be readily apparent from the foregoing that any variation in the frequency of the oscillator 43 produces a change in the output of the amplifier 55 which in turn biases an electrode of the oscillator thereby tending toward stabilization of the frequency of the oscillator.

It will be clear to those skilled in microwave apparatus that the hybrid circuits A, B, and C may be reproduced at very low cost compared to hybrid circuits of the rectangular waveguide or coaxial type, that the reproduction is easily obtained by printed circuit techniques, that the planar conductor, which forms a part of the transmission circuitry, may comprise a panel or other wall of a chassis, that various components, such as crystal holders, oscillators, cavity resonators, tubes, resistors, capacitors and coils may be supported by the planar conductor from the side opposite to the hybrid circuits, the planar conductor thus also acting as a "shield" between the circuitry and associated components, and that couplings between such components and circuitry are easily made directly through the planar conductor. It will also be readily apparent that the same ground conductor may be employed as a support and heat conductor for the components of the I.-F. and audio sections, and if desired, also as a support for other circuitry that may comprise parts of either the high or low frequency sections. While the portions of the I.-F. or "low" section of Figs. 1 and 2 indicate conventional wiring, it will be recognized to those skilled in the art that the circuitry of the I.-F. section as well as other associated circuitry may be applied to the dielectric layer 3 by means of printed circuit techniques, similar to the technique for applying the microwave transmission circuitry of the high frequency circuits A, B, and C.

Figure 7:
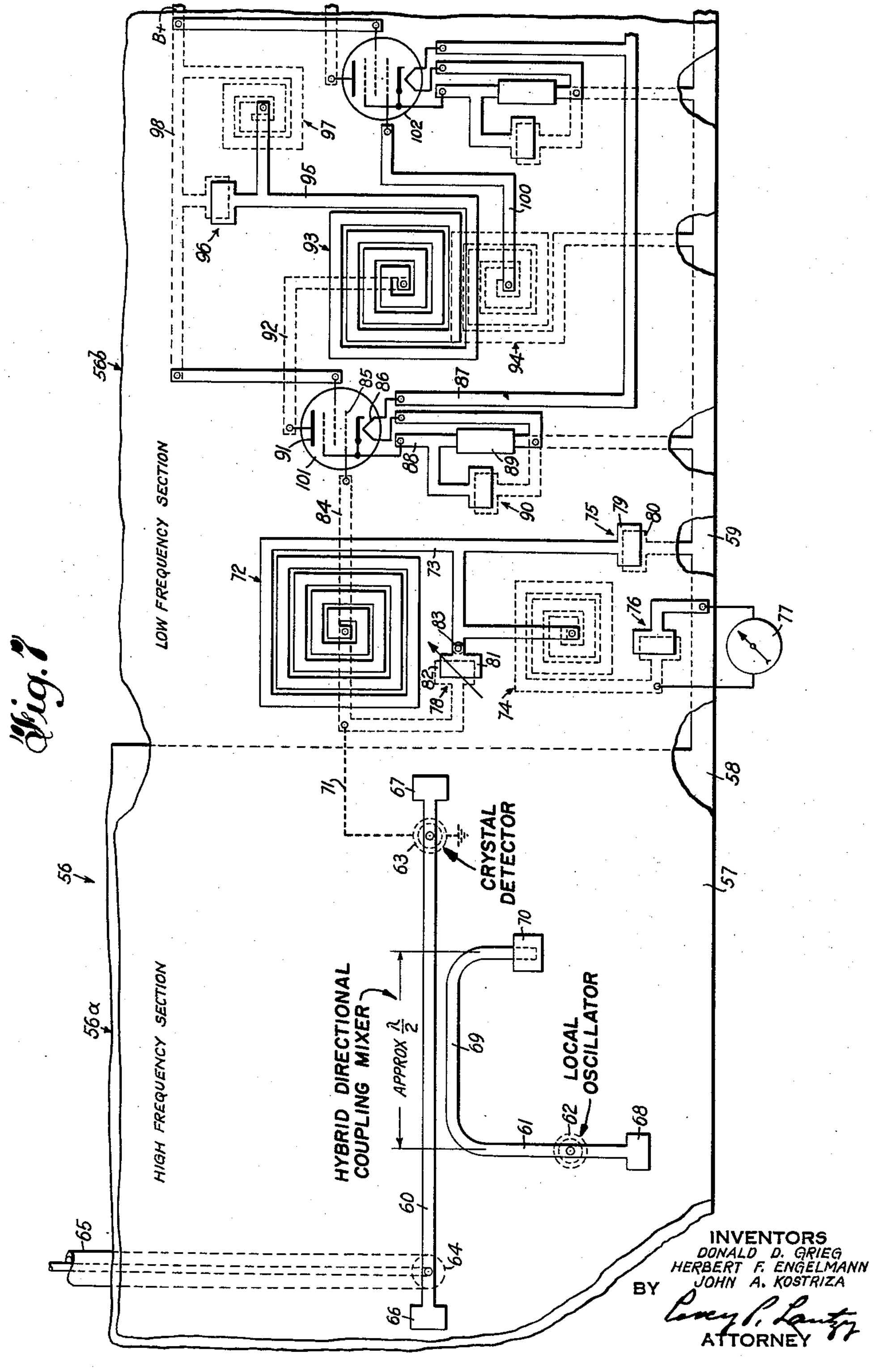
Fig. 7 is a view in plan of the high and low frequency panel sections of another embodiment of the invention.

In Fig. 7 we show another receiver embodiment having both the high and low frequency sections thereof printed on a common panel in accordance with the principles of this invention. The panel 56 is shown to comprise a sheet of dielectric material 57 having a layer of conductive material 58 on one side thereof covering the area corresponding to the high frequency section. Parts of the layer of conductive material 58 may also underlie certain areas of the low frequency section, such as indicated by the ground bus-bar 59 as well as the circuitry indicated in broken lines in Fig.7. One of the preferred printed circuit techniques that may be employed comprises coating both sides of a dielectric strip with layers of conductive material, such as copper, printing on the conductor's sheets the desired circuitry, bus-bars and planar conductor areas, the printing process utilizing a material which protects the covered conductor parts from the action of the etching bath to which the panel is thereafter subjected. The uncovered conductor portions are etched away leaving the desired printed circuitry including bus bars, coils, connecting circuits and planar conducting areas. The covering material is then removed and the necessary components applied as desired.

Referring more particularly to the circuitry disclosed in Fig. 7, it will be observed that the high frequency section 56a is provided with a layer of conductive material forming a planar conductor with respect to which line conductors printed on the dielectric sheet 57 cooperate to form high frequency transmission paths. While the planar conductor area 58 is shown to underlie the entire section 56a this, of course, is not essential so long as sufficient planar conductor is provided to fully underlie the high frequency circuitry. One advantage, however, of having the planar conductor 58 underlie all or substantially all of the high frequency section is that it provides an effective shield between the high frequency circuitry and the components mounted on the planar conductor side of the panel. The conductor sheet also serves as a heat conductor for heat dissipation. The high frequency circuitry here shown comprises two strip conductors 60 and 61. The two strips are so associated as to provide a hybrid coupling whereby incoming radio frequency signals may be mixed with the output of a local oscillator 62, for application to a crystal detector 63 from which is obtained an intermediate frequency for coupling to the low frequency section 56b. The strip 60 interconnects a junction 64 with the crystal 63, the junction 64 being a coaxial coupling for the coaxial lead 65 of an antenna, similarly as disclosed for the antenna coupling 15 of Fig. 3. The crystal 63 is coupled to the transmission path of strip 60 similarly as shown at 22 in Fig. 3. The strip 60 is terminated beyond the two junctions 63 and 64 by means of extended conductive areas 66 and 67 which form capacitive susceptances for impedance matching of the adjacent junctions.

The junction coupling the local oscillator 62 to the strip 61 is the same as illustrated in Fig. 4. The susceptance 68 is provided on an extension of the strip 61 for impedance matching of the junction to the local oscillator 62. The strip 61 is provided with a portion 69 disposed in close parallel relation to the strip 60 for a distance of approximately a half wavelength or a multiple thereof to function as a directional coupler and in this illustration as a hybrid mixer. The other end of the strip 61 is provided with a terminal load 70.

In operation of the circuitry of the high frequency section 56a the incoming radio frequency signals are coupled over coaxial line 65 to the transmission path formed by the line 60 and the adjacent surface of the planar conductor 58. The output of the local oscillator is applied to the transmission path formed by the strip 61 and the adjacent planar surface of conductor 58. The two frequency waves are mixed in the directional coupling portion of the circuitry, the resulting waves dividing between the terminal load 70 and crystal 63. The crystal 63 detects the waves of lower frequency for transmission to the intermediate frequency stages of the low frequency section 56b.

The low frequency section 56b is partially shown to illustrate a printed circuit portion thereof in combination with the printed circuit of the high frequency section on a common panel. The output connection 71 of crystal 63 is connected to the center of a printed coil 72, the outer turn 73 of the coil being connected in parallel to a choke coil 74, also printed, and a capacitor 75, the other side of which is connected to ground. The choke 74 is connected through a by-pass capacitor 76 to ground and a monitor indicator 77 is connected across capacitor 76 for indication of crystal current. Coupled across the coil 72 is a variable capacitor 78.

The fixed capacitors 75 and 76 are formed by two plates 79 and 80 printed on opposite sides of the dielectric sheet 57. The variable capacitor 78 is likewise formed of two capacitor plates 81 and 82, the overlap of the plates being adjustable by the pivotal connection 83 of plate 81.

Line conductor 84 is coupled from the crystal lead 71 to the control grid 85 of a pentode 101. The pentode tube is preferably supported by a suitable socket carried by the panel. If desired, miniature tubes may be employed, similarly as indicated in Figs. 1, 2, and 3, it being understood, however, that any suitable socket may be employed. The cathode is provided with the usual heater 86 to which current leads 87 and 88 are provided by printed strips carried by the dielectric sheet 57. The cathode is provided with a biasing circuit comprising resistor 89 and capacitor 90, the resistor 89 being of a resistive material which may be applied by a known printed method. The anode 91 is connected by a printed lead 92 to a transformer coupling comprising primary coil 93 and secondary coil 94, the two coils being printed on opposite sides of the dielectric sheet 57. The other end of the primary coil is connected by lead 95 through a capacitor 96 and a choke coil 97 to a printed bus bar 98 to which a B potential is applied. The secondary coil 94 has one end 99 coupled to the ground bus bar 59 and the other end 100 coupled to the control grid of a pentode tube 102 of the next I.-F. stage.

The remaining portion of the low frequency section **56*b*** is similarly printed as illustrated for the first two I.-F. stages, the printing following the illustration herein furnished. Insofar as the present invention is concerned, the illustration shown in Fig. 7 indicates a common panel arrangement for both the high and low frequency sections. It will be understood, of course, that the common panel principle and the construction thereof may be varied considerably and applied totally to many different types of radio circuits without departing from the present invention. The high frequency circuitry may, of course, be considerably more elaborate than that shown in Fig. 7, the particular circuitry illustrated in Fig. 1 being an example only of one of several high frequency printed sections that may be provided. The type of hybrid circuit, for example, may be quite different from either of those illustrated in Figs. 1 and 7. Additional examples of such couplers in line-above-ground relationship are disclosed in the copending application of H. Seidel, Serial No. 234,319, filed June 29, 1951, now Patent No. 2,721,-309, and J. A. Kostriza-P. Terranova, Serial No. 274,932, filed March 5, 1952, now Patent No. 2,749,519.

While we have described above the principles of our invention in connection with specific apparatus, it is to be clearly understood that this description is made by way of example only and not as a limitation to the scope of our invention as set forth in the objects thereof and in the accompanying claims.

We claim:

1. In an electronic device having a high frequency section for radio frequencies and a low frequency section for intermediate and audio frequencies, a sheet of dielectric material common to the areas of both said sections, a layer of conductive material on one side of said sheet forming a planar conductor in the area of said high frequency section, said high frequency section having conductor circuitry on the other side of said sheet of dielectric material in parallel spaced relation to said planar conductor to form two-conductor waveguide paths for radio frequency energy, each path consisting solely of a single-line-above-a-single-ground plane, the thickness of the dielectric spacing therebetween being a minor fraction of the wavelength at the mean frequency of the radio frequency energy and the conductor widths of said conductor circuitry being considerably less than the width of the adjacent portion of said planar conductor for propagation therealong of radio frequency signals in a mode approximately the TEM mode with the main portion of an electric field of a wave propagated along each line being distributed between solely one surface of said line and the opposing surface of said layer forming said ground plane, and means for coupling radio frequency signal energy to said circuitry and to said planar conductor for waveguide propagation along and between the parallel conductor paths formed by said circuitry and said planar conductor, said low frequency section having circuitry and means including connections to said planar conductor for coupling together electrically the circuitry of said high and low frequency sections.

2. In an electronic device according to claim 1, wherein the layer of conductive material of said high frequency section extends into the area of said low frequency section and the circuitry of said low frequency section includes means connecting certain parts of the low frequency circuitry to said extended portion as a common "ground" potential for said low frequency circuitry.

3. In an electronic device according to claim 1, wherein the high frequency section includes a mixer circuit having two input conductors and an output conductor to form high frequency paths in conjunction with said planar conductor, means for coupling a radio frequency signal between one of said input conductors and said planar conductor, a local oscillator, means to couple said local oscillator between the other of said input conductors and said planar conductor, a crystal detector, and means coupling said crystal detector between said output conductor and said planar conductor.

4. In an electronic device according to claim 3, wherein said local oscillator and said crystal detector are disposed on the planar conductor side of said sheet of dielectric material and each has a coaxial coupling arrangement comprising inner and outer conductors, the outer conductor being connected directly to said planar conductor and said inner conductor being coupled through an opening in said planar conductor to a respective conductor of said mixer circuit.

5. In an electronic device having a high frequency section for radio frequencies and a low frequency section for intermediate and audio frequencies, a panel common to both of said sections, said panel comprising at least in part a planar conductor and a sheet of dielectric material, said high frequency section having at least one mixer circuit which includes said planar conductor and a plurality of line conductors, said sheet of dielectric material disposing said line conductors in closely spaced substantially parallel relation to said planar conductor to establish high frequency transmission paths therewith, each path consisting of a single line above a single ground plane, the dielectric spacing between each line conductor and the adjacent planar conductor being a minor fraction of the wavelength of the mean radio frequency and the adjacent planar conductor portions being wide compared to the width of said line conductors for propagation of radio frequency signals along said line conductors between the line conductors and said planar conductor in a mode approximating the TEM mode with the main portion of an electric field of a wave propagated along each line being distributed between solely one surface of said line and the opposing surface of said planar conductor forming said ground plane, the said line conductors of said mixer circuit being disposed to present two input branches and an output branch, means coupling radio frequency signal energy between the line conductor and the adjacent planar conductor portion of each of said input branches and detector means coupled between the line conductor and the adjacent planar conductor portion forming said output branch; and said low frequency section having a signal amplifying device supported by said panel with the ground connection thereof coupled to said planar conductor and the input connection thereof coupled to the output of said detector means.

6. In an electronic device according to claim 5 wherein two of the line conductors of said mixer circuit are disposed in parallel relation to each other and to said planar conductor for approximately a half wavelength or multiple thereof for intermixing of signals applied thereto.

7. In a receiver, a high frequency section, a low frequency section, a panel common to both said sections, said panel being comprised, at least in part, of a planar conductor and a solid sheet of dielectric material, said high frequency section having at least one distributed constants mixer circuit which includes said planar conductor and a plurality of line conductors, said sheet of dielectric material disposing said line conductors in closely spaced substantially parallel planar relation to said planar conductor to establish high frequency transmission paths therebetween, the thickness of said line conductor in the area of said high frequency transmission paths being a minor fraction of a wavelength at the mean high frequency, said line conductors being coupled together as a plural branch hybrid circuit of distributed constants whereby high frequency waves applied to two of said branches beat together for application to an output branch thereof, said low frequency section having lumped constants components and an electron discharge device supported by said panel with the ground connections of the low frequency section coupled to said planar conductor and detector means coupling said output branch to said electron discharge device, the plural branch hybrid circuit comprising four branches coupled together so that frequency waves applied over a first branch divides between the second and fourth branches to the exclusion of the third branch and frequency waves applied over said third branch divides between said second and fourth branches to the exclusion of said first branch, a source of signal energy, a local oscillator, means coupling said signal energy to the high frequency path of said first branch and means for coupling said local oscillator to the high frequency path of said third branch, the means for coupling the local oscillator to said third branch including a second hybrid circuit having four branches, said local oscillator being coupled to the third branch of said second hybrid circuit while the fourth branch thereof is coupled to the third branch of said first hybrid circuit, an AFC circuit for said oscillator and means coupling said first and said second branches of said second hybrid circuit to said AFC circuit.

8. In a receiver according to claim 7, wherein the AFC circuit includes a third hybrid circuit having four branch conductors, the first branch of said third hybrid circuit being coupled to the second branch of said second hybrid circuit, a cavity resonator coupled to the fourth branch of said third hybrid circuit, the second branch of said third hybrid circuit being shorted to said planar conductor, a balanced amplifier, detector means coupling the first branch of said second hybrid circuit and the third branch of said third hybrid circuit to said amplifier and means coupling the output of said amplifier to said local oscillator.

9. In a receiver, a hybrid circuit comprising a planar conductor, a layer of dielectric material disposed adjacent the planar surface of said conductor and four branch conductors disposed adjacent said layer of dielectric in closely spaced substantially parallel planar relation to said planar conductor to establish high frequency transmission paths with respect to said planar conductor, said branch conductors being coupled together so that an application of high frequency waves to a first one of said branches divides between the second and fourth branches to the exclusion of the third branch and an application of high frequency waves to said third branch divides between said second and fourth branches to exclusion of said first branch, means to apply high frequency signals to said first branch, a local oscillator, means to apply the output of said local oscillator to said third branch, and detector means coupled to said second and fourth branches to obtain an output from said hybrid circuit, the means for coupling the local oscillator to said third branch including a second hybrid circuit also having four branch conductors, the oscillator being coupled to the third branch of said second hybrid circuit, the fourth branch of said second hybrid circuit being coupled to the third branch of said first mentioned hybrid circuit, an AFC circuit for said oscillator and means coupling the third and fourth branches of said second hybrid circuit to said AFC circuit.

10. In a receiver according to claim 9, wherein the AFC circuit includes a third hybrid circuit having four branch conductors also disposed in substantially parallel relation to said planar conductor, the first branch of said third hybrid circuit being coupled to the second branch of said second hybrid circuit, a cavity resonator coupled to the fourth branch of said third hybrid circuit, the second branch of said third hybrid circuit being shorted to said planar conductor, a balanced input amplifier, detector means coupling the first branch of said second hybrid circuit and the third branch of said third hybrid circuit to said amplifier and means coupling the output of said amplifier to said local oscillator.

11. In a receiver, an oscillator, an AFC circuit for said oscillator, hybrid circuits for coupling the AFC circuit to said oscillator comprising a planar conductor, a first hybrid circuit having four branch conductors disposed in closely spaced, substantially parallel relation to the surface of said planar conductor to establish high frequency transmission paths, the branch conductors being coupled together so that high frequency input waves applied to the third branch thereof is divided between the second and fourth branches to the exclusion of the first branch, means coupling the output of said oscillator to said third branch whereby said fourth branch comprises the output of said hybrid circuit while the second branch comprises a part of said AFC circuit, a second hybrid circuit having four branch conductors also disposed in closely spaced substantially parallel relation to said planar conductor, the second branch of said first hybrid circuit being coupled to the first branch of said second hybrid circuit, a cavity resonator coupled to the fourth branch of said second hybrid circuit, the second branch of said second hybrid circuit being shorted to said planar conductor whereby reflections from said cavity resonator and said shorted branch divides between the first and third branches of said second hybrid circuit, an attenuator associated with the first branch of said second hybrid circuit, the reflected energy received past said attenuator being divided between the first and third branches of said first hybrid circuit, a balanced input amplifier, detector means coupled to the first branch of said first hybrid circuit and to the third branch of said second hybrid circuit to said amplifier and means coupling the output of said amplifier to said oscillator.

No references cited.